US009353555B2

(12) United States Patent
LaConte

(10) Patent No.: US 9,353,555 B2
(45) Date of Patent: May 31, 2016

(54) METHOD OF FABRICATING POTTED PANEL LATCH SYSTEM

(71) Applicant: Harper Engineering Co., Renton, WA (US)

(72) Inventor: Richard J. LaConte, Black Diamond, WA (US)

(73) Assignee: Harper Engineering Co., Renton, WA (US)

( * ) Notice: Subject to any disclaimer, the term of this patent is extended or adjusted under 35 U.S.C. 154(b) by 200 days.

(21) Appl. No.: 14/088,085

(22) Filed: Nov. 22, 2013

(65) Prior Publication Data

US 2014/0137385 A1 May 22, 2014

Related U.S. Application Data

(62) Division of application No. 12/849,572, filed on Aug. 3, 2010, now Pat. No. 8,616,621.

(51) Int. Cl.
| | |
|---|---|
| *E05B 79/00* | (2014.01) |
| *B64D 11/00* | (2006.01) |
| *E05B 9/08* | (2006.01) |
| *F16B 11/00* | (2006.01) |
| *B21D 53/92* | (2006.01) |
| *E05C 1/14* | (2006.01) |
| *E06B 3/70* | (2006.01) |

(52) U.S. Cl.
CPC ............. *E05B 79/00* (2013.01); *B64D 11/003* (2013.01); *E05B 9/08* (2013.01); *B21D 53/92* (2013.01); *B23P 2700/12* (2013.01); *B23P 2700/50* (2013.01); *E05C 1/145* (2013.01); *E06B 3/7017* (2013.01); *E06B 2003/7046* (2013.01); *F16B 11/006* (2013.01); *Y10T 29/49826* (2015.01); *Y10T 29/49904* (2015.01); *Y10T 29/49963* (2015.01); *Y10T 29/49966* (2015.01)

(58) Field of Classification Search
CPC .................. Y10T 29/49904; Y10T 29/49906; Y10T 29/49963; Y10T 29/49966; B64D 11/003; E06B 2003/7046; E05C 1/145; E05B 79/00; F16B 11/006; B21D 53/92; B23P 2700/12; B23P 2700/01; B23P 2700/50
See application file for complete search history.

(56) References Cited

U.S. PATENT DOCUMENTS

| | | | |
|---|---|---|---|
| 3,598,273 | A | 8/1971 | Rau et al. |
| 3,964,636 | A | 6/1976 | Rehrig |
| 4,344,995 | A | 8/1982 | Hammer |
| 4,799,631 | A | 1/1989 | Humphries et al. |
| 4,867,395 | A | 9/1989 | Taylor et al. |
| 4,936,377 | A | 6/1990 | DeVogel et al. |
| 5,005,531 | A | 4/1991 | Nelson |
| 5,028,474 | A | 7/1991 | Czaplicki |

(Continued)

FOREIGN PATENT DOCUMENTS

CA     2348248 A1 * 11/2001

OTHER PUBLICATIONS

Shur-Lok Products, Sandwich Structure, URL: http://www.shur-lok.com/contents/products/sandwich.html, 2012, download date Aug. 12, 2013.

*Primary Examiner* — Jermie Cozart
(74) *Attorney, Agent, or Firm* — Seed IP Law Group PLLC

(57) ABSTRACT

A method of preparing a finished panel and latch combination, wherein the panel and latch mounting combination are seamless and attractive.

13 Claims, 5 Drawing Sheets

(56) References Cited

U.S. PATENT DOCUMENTS

| | | |
|---|---|---|
| 5,086,587 A | 2/1992 | Andrews |
| 5,108,048 A | 4/1992 | Chang |
| 5,150,863 A | 9/1992 | Hozumi |
| 5,795,043 A | 8/1998 | Johnson et al. |
| 6,056,349 A | 5/2000 | Seksaria et al. |
| 6,531,806 B1* | 3/2003 | Daidai ......................... 310/344 |
| 6,574,841 B1 | 6/2003 | Vosahlik et al. |
| 6,623,209 B1 | 9/2003 | Waters, Jr. |
| 6,718,776 B2 | 4/2004 | Wessling et al. |
| 6,742,974 B2 | 6/2004 | Haire |
| 7,380,858 B2 | 6/2008 | Araga et al. |
| 7,484,792 B2 | 2/2009 | Penner |
| 7,537,264 B2 | 5/2009 | Maimin et al. |
| 7,637,686 B2 | 12/2009 | Wood et al. |
| 7,789,452 B2 | 9/2010 | Dempsey et al. |
| 7,874,587 B2 | 1/2011 | Miki et al. |
| 7,931,237 B2 | 4/2011 | Penzo |
| 7,942,430 B2 | 5/2011 | Van Loon et al. |
| 7,971,394 B1* | 7/2011 | Dowling et al. ................ 49/506 |
| 8,061,758 B2 | 11/2011 | Maimin et al. |
| 8,182,021 B2 | 5/2012 | Maimin et al. |
| 8,215,585 B2 | 7/2012 | Gerken et al. |
| 8,286,917 B2 | 10/2012 | Erickson et al. |
| 8,286,919 B2 | 10/2012 | Gerken et al. |
| 2003/0024191 A1 | 2/2003 | Hampel |
| 2005/0028333 A1 | 2/2005 | Vosahlik et al. |
| 2005/0252114 A1 | 11/2005 | Marschall |
| 2007/0267889 A1 | 11/2007 | Flendrig et al. |
| 2008/0110056 A1 | 5/2008 | Mann et al. |
| 2012/0205939 A1 | 8/2012 | Maimin et al. |

\* cited by examiner

METHOD OF FABRICATING POTTED PANEL LATCH SYSTEM

TECHNICAL FIELD

This invention relates to a recessed latch system, and more particularly to a latch system which is fabricated in a fashion that creates a seamless appearance and complements or blends in with the supporting panel, greatly improving the appearance and sanitation.

BACKGROUND OF THE INVENTION

Latch members for securement for storage in passenger vehicles, including airplanes, have typically been recessed to avoid inadvertent snags or injuries. Typically, these latch members are pre-fabricated and simply secured into a pre-prepared opening in the panel. Although this is economical and functional, it yields a product which is utilitarian, unattractive and creates an environment difficult to clean.

Hardware for use in airplanes in particular needs to be reliable, lightweight and attractive. Because of the economics and environment, these devices must be quickly and easily sanitized.

SUMMARY OF THE INVENTION

With the above-noted background in mind, it is highly desirable to produce a recessed latch system wherein the latch appears to be an integral part of the supporting panel.

It is further desirable to provide a recessed latch system wherein the exposed body of the latch and the surface of the panel present a unitary appearance.

It is still further desirable that a recessed latch and panel be fabricated in a manner which is simple and economical, yielding an attractive, seamless product.

BEST MODE FOR CARRYING OUT THE INVENTION

Figure 1:
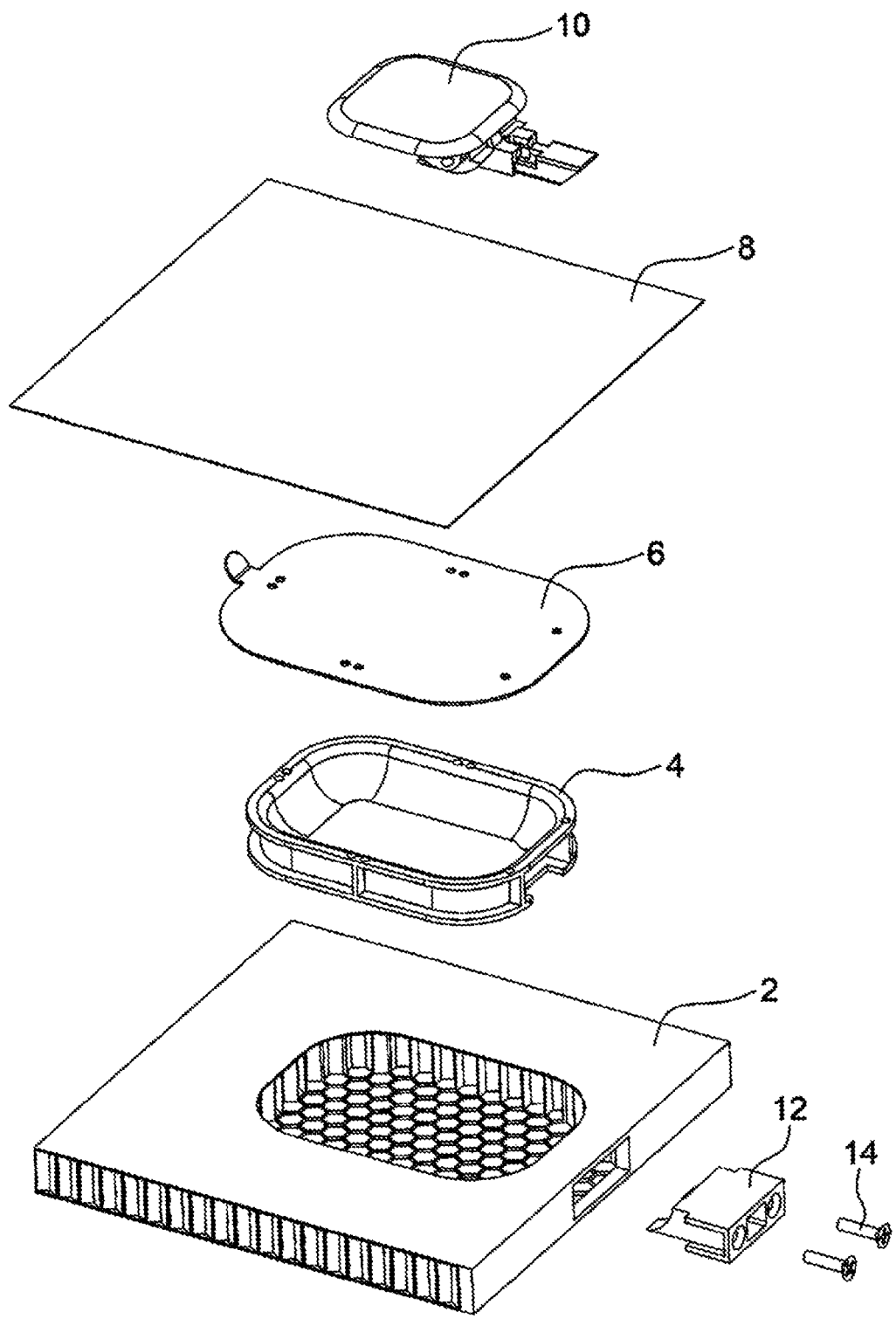
FIG. 1 is an exploded view of the recessed latch, its component parts as well as the supporting panel.

As seen in FIG. 1, which is exploded to expose all parts of the inventive installation, there is a honeycomb panel 2, a latch body or base 4, a blank or potting cover 6, a decorative coating or sheet 8 and a latch mechanism 10. Also seen in this view is a latch guide 12 and securement screws 14.

Figure 2:
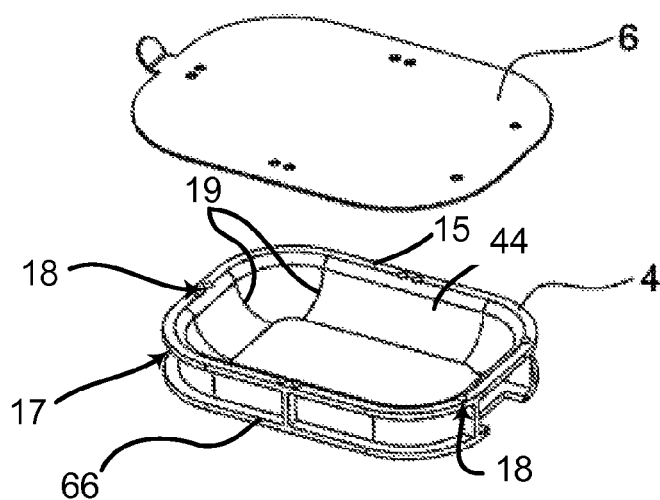
FIG. 2 displays the pre-assembly of the potting cove to the latch body.
Figure 3:
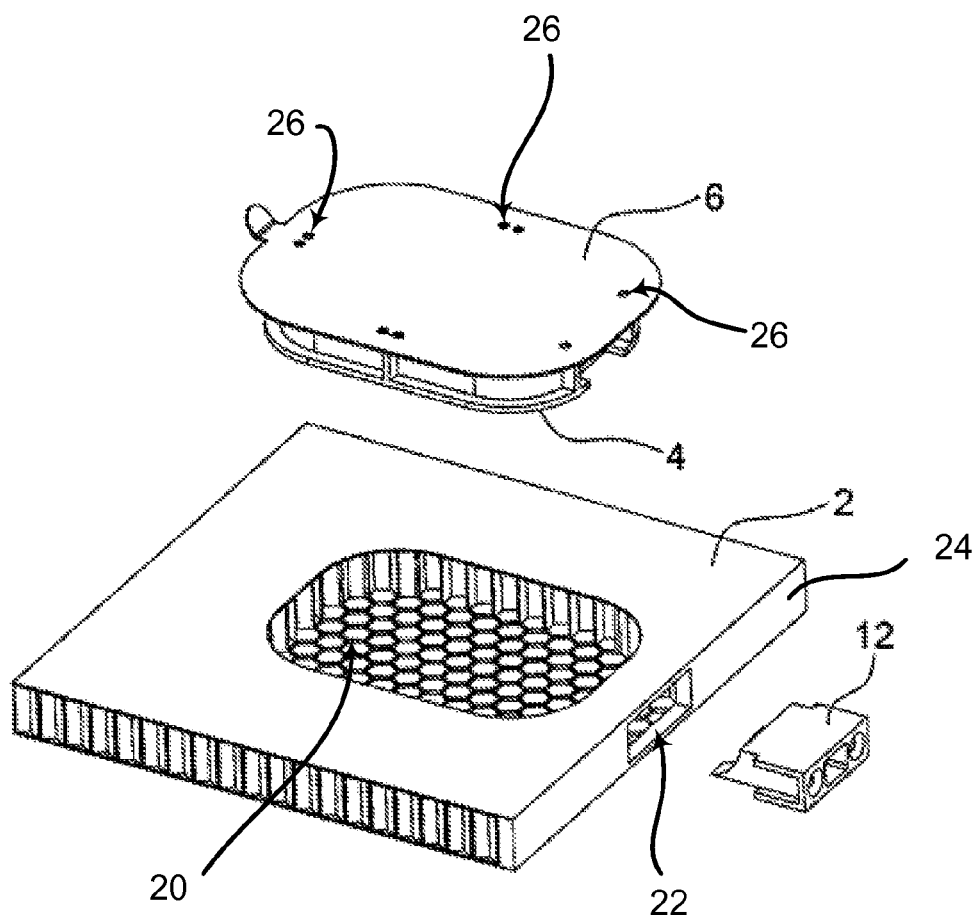
FIGS. 3, 4 and 5 illustrate steps in the process.
Figure 4:
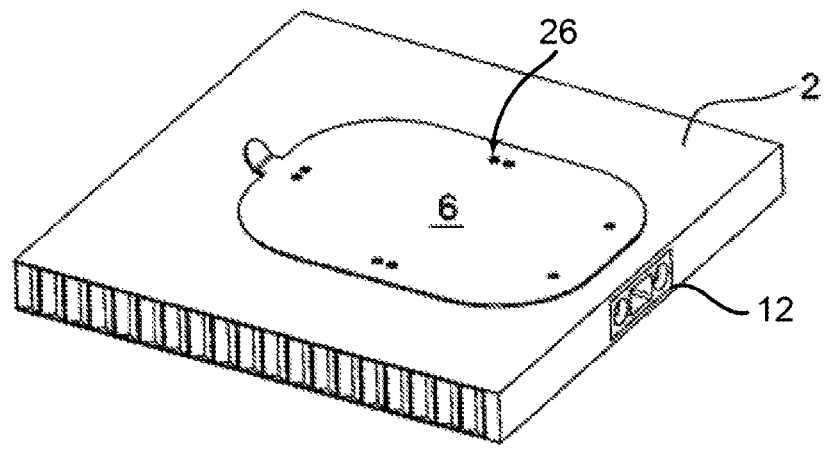
Figure 5:
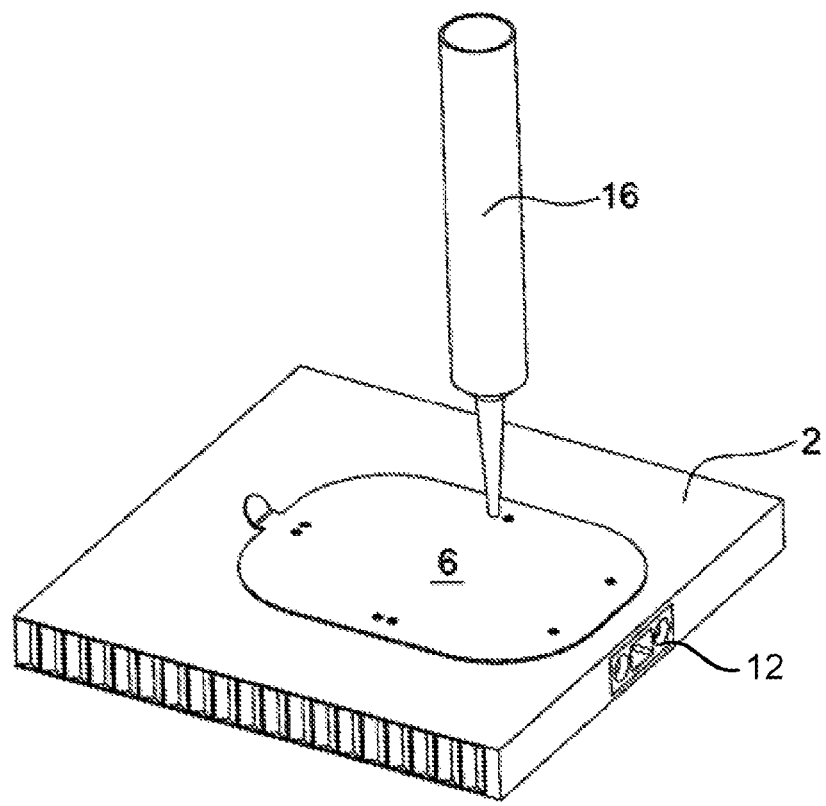

Reference is now had to FIGS. 2, 3, 4 and 5, wherein a base 4 and latch guide 12 are potted into a honeycomb panel 2. FIG. 2 depicts a potting cover 6 attached to the base 4. As illustrated in FIG. 2, the base 4 includes interior side walls 44 that form a boundary around the base 4, with an upper flange 15 extending outwardly from an upper end of the base 4 and a lower flange 66 extending outwardly from a lower end of the base 4, creating a cavity 17 therebetween. The interior side walls 44 include a plurality of seams 19 that are generally positioned around corner portions of the base 4. The upper flange 15 includes a plurality of apertures 18, which allow adhesive to be applied therethrough, as illustrated in FIG. 5, and fill the cavity 17 so as to allow the adhesive to bond the base 4 to the honeycomb panel 2. FIG. 3 shows the base 4 with the potting cover 6 positioned to be placed into a prepared cavity or recess 20 of the honeycomb panel 2. The potting cover 6 includes a plurality of apertures 26 that are positioned at a perimeter of the potting cover 6 and substantially align with the plurality of apertures 18 of the base 4 so as to allow the adhesive to be applied therethrough. Further, as illustrated in FIG. 3, the latch guide 12 is positioned to be coupled to the honeycomb panel 2 by securing the latch guide 12 within a latch guide opening 22. The latch guide opening 22 extends through a side surface 24 of the honeycomb panel 2 and intersects the recess 20. FIG. 4 illustrates the base 4 with the potting cover 6 secured to the prepared cavity or recess 20 and the latch guide 12 secured into the latch guide opening 22 of the panel 2; then it is potted in place using an adhesive applicator tube 16, as shown in FIG. 5. Thereafter, after applying the adhesive and the base 4 is potted in place, the potting cover 6 is removed.

Figure 6:
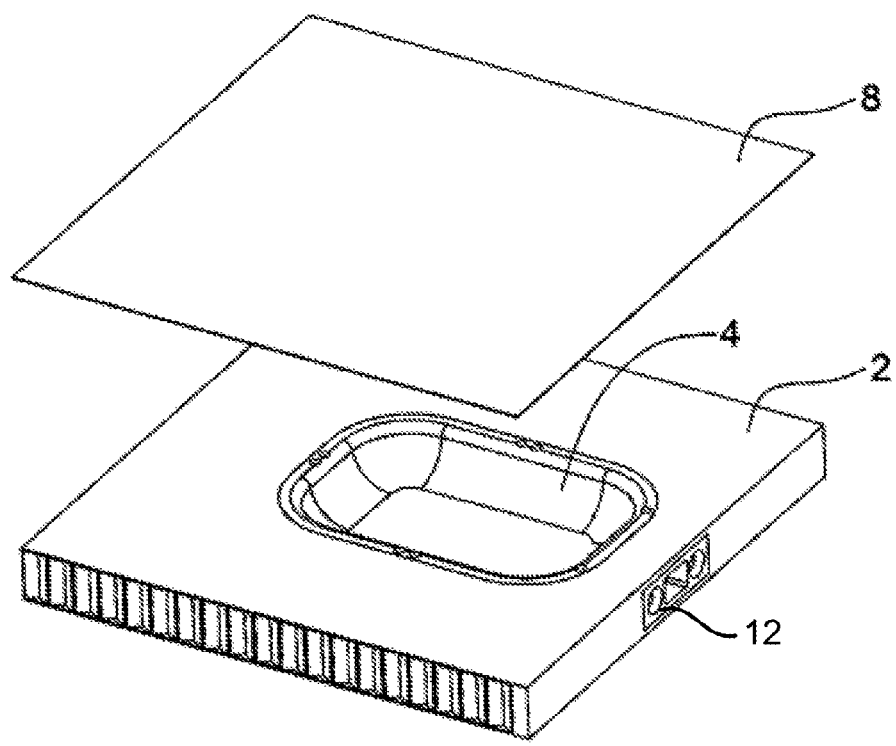
FIG. 6 is an exploded view displaying the decorative sheet about to be secured in places.
Figure 7:
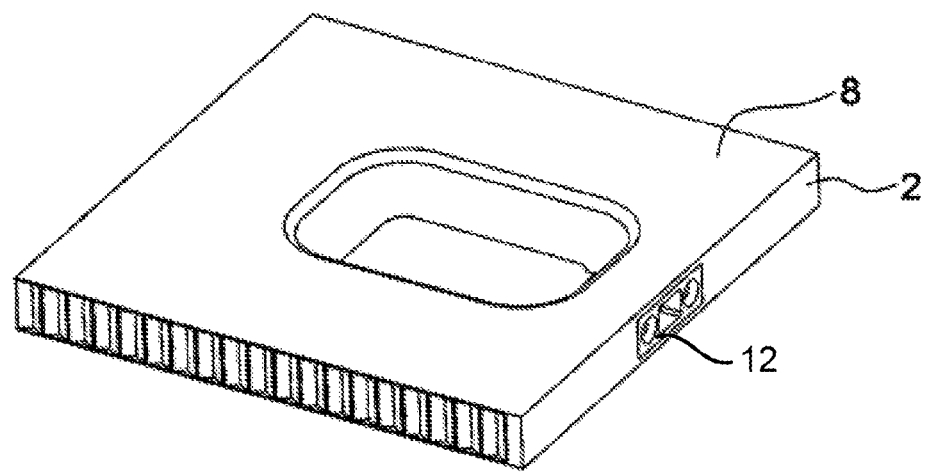
FIG. 7 shows the decorative sheet having been vacuumed and secured in position.

Reference is now had to FIG. 6, wherein the base 4 is in place and the decorative coating 8 is about to be placed over the secured base 4 for the panel 2 and vacuumed into the cavity 20, covering the base 4 and the panel 2, forming a seamless transition from the surface of the panel throughout the base 4, as best seen in FIG. 7. This results in an attractive, easily cleaned panel and latch member.

Figure 8:
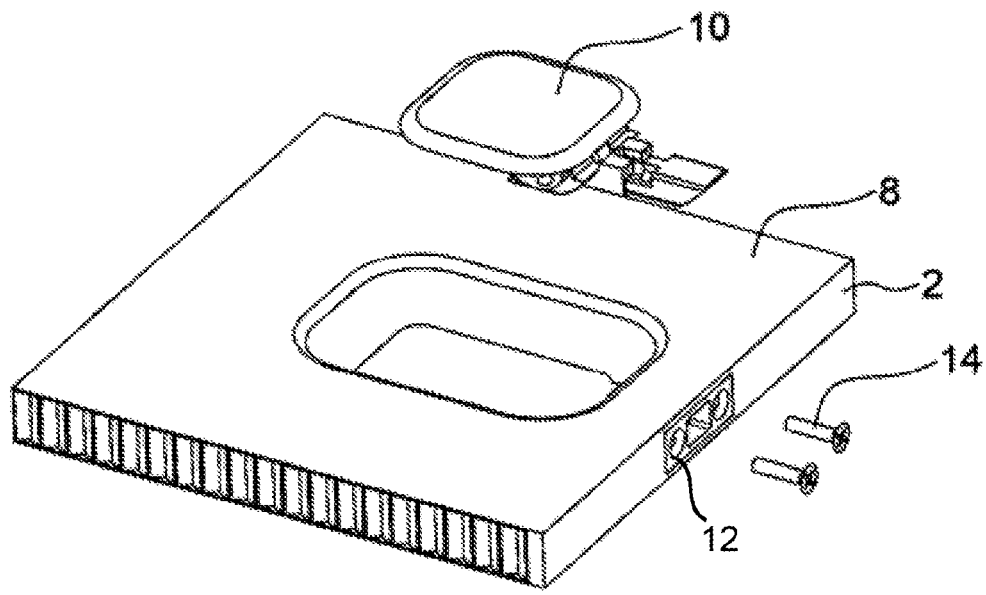
FIG. 8 shows the mechanism about to be inserted into the prepared body and panel.
Figure 9:
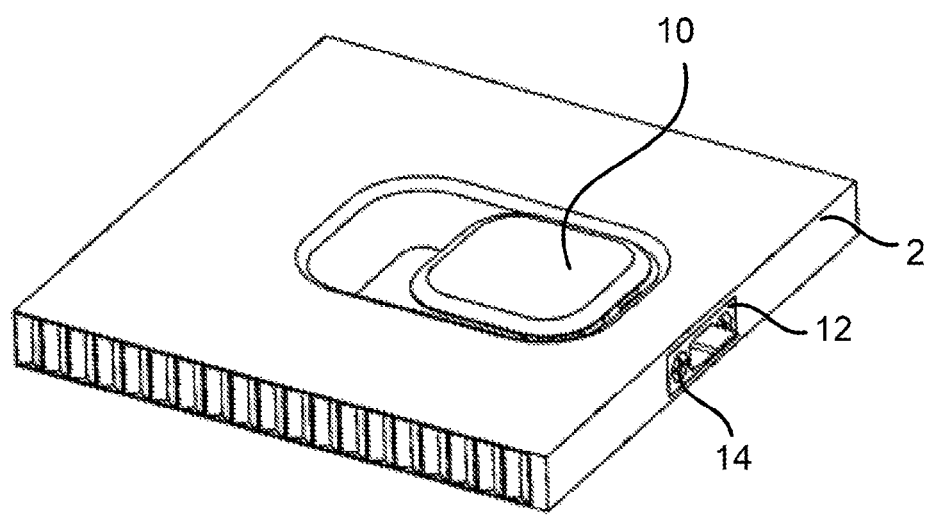
FIG. 9 displays the completed decorative seamless product.

As seen in FIG. 8, the latch mechanism 10 then is in place in position and secured with the screws 14, inserted through the latch guide 12, resulting in a finished panel and latch combination as seen in FIG. 9, wherein the smooth transition and the panel throughout the latch base is seamless and attractive.

Although a preferred embodiment has been disclosed for purposes of illustration, it should be understood that various changes and modifications and substitutions could be made in the preferred embodiment without departing from the spirit of the invention, as defined by the claims which follow:

What is claimed is:

1. A method of fabricating a potted panel latch, the method comprising:
   providing a panel;
   removing material from a face of the panel to form a recess therein, the recess being sized and shaped to receive a latch body;
   securing a latch body within the recess, the securing including:
      inserting the latch body within the recess; and
      applying an adhesive through apertures positioned on a flange of the latch body, the latch body including a cavity formed around an interface between the latch body and the panel, the cavity being filled with the adhesive so as to bond the latch body to the panel; and
   coupling a decorative sheet to the face of the panel, the decorative sheet overlying the latch body and a portion of the panel to provide an appearance of a continuous panel.

2. The method of claim 1, further comprising:
   securing a potting cover to the latch body and a portion of the panel;

applying the adhesive through potting cover apertures, the potting cover apertures being located to align with the apertures of the latch body; and removing the potting cover after applying the adhesive.

3. The method of claim 1, further comprising:

securing a latch guide through a latch guide opening.

4. The method of claim 1, further comprising:

coupling a latch mechanism to the panel, wherein the latch mechanism is positioned within the latch body.

5. The method of claim 4 wherein coupling the latch mechanism comprises:

inserting the latch mechanism within the latch body;

inserting a latch guide through a latch guide opening formed through a side surface of the panel; and fastening the latch guide to the latch mechanism with screws.

6. The method of claim 1 wherein coupling the decorative sheet includes applying a vacuum to draw the decorative sheet through the recess to provide an appearance of a continuous panel.

7. A method to decorate a face of a panel, the method comprising:

providing the panel;

forming a recess in the face of the panel, the recess being configured to receive a latch body;

securing the latch body within the recess, the securing including:

inserting the latch body within the recess; and applying an adhesive through apertures positioned on a flange of the latch body, the latch body including a cavity formed around an interface between the latch body and the panel, the cavity being filled with the adhesive so as to bond the latch body to the panel; and decorating the face of the panel to provide an appearance of a continuous panel.

8. The method of claim 7 wherein the decorating comprises overlaying a decorative coating over the latch body and a portion of the panel.

9. The method of claim 7, further comprising:

securing a latch guide through a latch guide opening located in the panel.

10. The method of claim 7, further comprising:

coupling a latch mechanism to the panel, wherein the latch mechanism is positioned within the latch body.

11. The method of claim 10 wherein coupling the latch mechanism comprises:

inserting the latch mechanism within the latch body;

inserting a latch guide through a latch guide opening formed through a side surface of the panel; and fastening the latch guide to the latch mechanism with screws.

12. A method of fabricating a potted panel latch, the method comprising:

providing a panel;

removing material from a face of the panel to form a recess therein, the recess being sized and shaped to receive a latch body;

securing the latch body within the recess; and fixedly coupling a decorative sheet to the face of the panel such that the decorative sheet is immovable relative to the face of the panel, the decorative sheet overlying the latch body and a portion of the panel to provide an appearance of a continuous panel.

13. A method of fabricating a potted panel latch, the method comprising:

providing a panel;

removing material from a face of the panel to form a recess therein, the recess being sized and shaped to receive a latch body;

securing the latch body within the recess;

fixedly coupling a decorative sheet to the face of the panel, the decorative sheet overlying the latch body and a portion of the panel to provide an appearance of a continuous panel;

inserting the latch body within the recess; and applying an adhesive through apertures positioned on a flange of the latch body, the latch body including a cavity formed around an interface between the latch body and the panel, the cavity being filled with the adhesive so as to bond the latch body to the panel.

* * * * *